US012508736B2

(12) United States Patent
Turunen et al.

(10) Patent No.: US 12,508,736 B2
(45) Date of Patent: Dec. 30, 2025

(54) METHOD AND ARRANGEMENT FOR FEEDBACK BASED CONTROL IN CHEMICAL REFINING OF WOOD

(71) Applicant: UPM-KYMMENE CORPORATION, Helsinki (FI)

(72) Inventors: Sami Turunen, Lappeenranta (FI); Mika Laitila, Hämeenlinna (FI); Juha Tamper, Levänen (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 1094 days.

(21) Appl. No.: 17/426,586

(22) PCT Filed: Jan. 27, 2020

(86) PCT No.: PCT/FI2020/050039
§ 371 (c)(1),
(2) Date: Jul. 28, 2021

(87) PCT Pub. No.: WO2020/157378
PCT Pub. Date: Aug. 6, 2020

(65) Prior Publication Data
US 2022/0097252 A1 Mar. 31, 2022

(30) Foreign Application Priority Data
Jan. 29, 2019 (FI) .................................. 20195056

(51) Int. Cl.
*D21B 1/36* (2006.01)
*B27K 3/02* (2006.01)
(Continued)

(52) U.S. Cl.
CPC ............. *B27K 3/025* (2013.01); *D21B 1/04* (2013.01); *D21B 1/36* (2013.01); *G01N 1/10* (2013.01);
(Continued)

(58) Field of Classification Search
CPC ........................ D21B 1/36; D21C 1/00–1/04
See application file for complete search history.

(56) References Cited

U.S. PATENT DOCUMENTS

2004/0022128 A1* 2/2004 Liljenberg ............. D21D 1/002
367/96
2009/0221814 A1* 9/2009 Pschorn .................. B27N 1/00
422/600

(Continued)

FOREIGN PATENT DOCUMENTS

EP 0172135 A1 * 2/1986 ............... D21C 3/22
EP 2 759 597 A1 7/2014
(Continued)

OTHER PUBLICATIONS

D'Agostino et al., Continuous Steam Explosion Pulping: A viable Alternative for Pulping of Non-woody Fibers, 1996, 1996 TAPPI Pulping Conference, p. 377-385 (Year: 1996).*
(Continued)

*Primary Examiner* — Anthony Calandra
(74) *Attorney, Agent, or Firm* — Nixon Peabody LLP

(57) ABSTRACT

Method and control system are provided for controlling values of process parameters of a pretreatment process of wood particles. A sampler is used to obtain a sample of a product flow of said pretreatment process after said wood particles have undergone steam explosion in a hemihydrolysis reactor. A particle measurement device is used to measure one or more characteristics of particles in said sample and to produce one or more pieces of measurement information indicative of the measured characteristics. Said one or more pieces of measurement information are used to select one or more values of one or more of said process parameters.

13 Claims, 2 Drawing Sheets

(51) Int. Cl.
  *D21B 1/04* (2006.01)
  *G01N 1/10* (2006.01)
  *G01N 1/28* (2006.01)
  *G01N 1/34* (2006.01)
  *G01N 15/02* (2006.01)
  *G01N 33/00* (2006.01)
  *G01N 15/00* (2006.01)

(52) U.S. Cl.
  CPC ............... *G01N 1/286* (2013.01); *G01N 1/34* (2013.01); *G01N 15/02* (2013.01); *G01N 33/0098* (2013.01); *G01N 2001/105* (2013.01); *G01N 2015/0042* (2013.01)

(56) References Cited

U.S. PATENT DOCUMENTS

| | | | | |
|---|---|---|---|---|
| 2012/0041186 | A1* | 2/2012 | Pschorn | D21C 7/00 536/56 |
| 2014/0083939 | A1* | 3/2014 | Nguyen | C12M 45/03 210/612 |
| 2014/0087432 | A1 | 3/2014 | Nguyen | |
| 2014/0311480 | A1 | 10/2014 | McDonald | |
| 2016/0244894 | A1 | 8/2016 | Ottonello | |
| 2016/0264875 | A1 | 9/2016 | Ottonello | |
| 2016/0312318 | A1* | 10/2016 | Ottonello | C13K 1/02 |

FOREIGN PATENT DOCUMENTS

| | | | | |
|---|---|---|---|---|
| WO | WO-0019004 A1 * | 4/2000 | | D21B 1/36 |
| WO | WO-2012066042 A1 * | 5/2012 | | C12M 41/26 |
| WO | WO 2013/120492 A1 | 8/2013 | | |
| WO | WO 2015/062737 A2 | 5/2015 | | |
| WO | WO 2015/124498 A1 | 8/2015 | | |
| WO | WO 2016/126185 A1 | 8/2016 | | |
| WO | WO 2017/066042 A1 | 4/2017 | | |

OTHER PUBLICATIONS

Rydholm, Pulping Processes, 1965, Interscience Publishers, p. 662-667.(Year: 1965).*

Finnish Search Report in Finnish Patent Application No. 20225795, mailed Mar. 30, 2023 (2 pages).

Communication in European Patent Application No. 20703800.1, mailed May 4, 2023 (4 pages).

Pielhop, T. et al. Steam explosion pretreatment of softwood: the effect of the explosive decompression on enzymatic digestibility. In: Biotechnology for Biofuels, Jul. 22, 2016, vol. 9, 152, <DOI:10.1186/s13068-016-0567-1> the whole article (11 pgs.).

Pasikatan, Melchor C. et al: "Near Infrared Reflectance Spectroscopy for Online Particle Size Analysis of Powders and Ground Materials", Journal of Near Infrared Spectroscopy, vol. 9, No. 3, Jun. 1, 2001 (Jun. 1, 2001), pp. 153-164, XP093042675, GB; ISSN: 0967-0335, DOI: 10.1255/jnirs.303; Retrieved from the Internet: URL:https://www.ars.usda.gov/ARSUserFiles/30200525/283JNIR-review.pdf (12 pgs.).

International Preliminary Report on Patentability in International Patent Application No. PCT/FI2020/050039, mailed May 10, 2021 (19 pages).

Finnish Search Report in Finnish Patent Application No. 20195056, mailed Aug. 29, 2019 (2 pages).

* cited by examiner

METHOD AND ARRANGEMENT FOR FEEDBACK BASED CONTROL IN CHEMICAL REFINING OF WOOD

FIELD OF THE INVENTION

The invention concerns the general technical field of converting biomass into chemical bioproducts in industrial scale. In particular the invention concerns the technology of maintaining appropriate quality of the product that comes through various pretreating stages.

BACKGROUND OF THE INVENTION

The production of biomass-based chemicals may use for example wood particles as the main raw material. In a biomass-to-sugar process the wood particles may be subjected to various kinds of pretreatment such as washing and impregnating with water and/or other liquids, and subjected to elevated temperature and pressure, in order to prepare the material for the later stages of the process.

A pretreatment process may involve soaking the wood particles in steam or hot water, then soaking them in dilute acid, and subsequently taking the acid-impregnated wood particles into a hemihydrolysis reactor where a steam explosion reaction breaks the particles into reaction products such as cellulose, hemicellulose (so-called C5 sugar), and lignin. Mechanical conveyors such as screw feeders transfer the impregnated wood particles between the stages of the pretreatment process.

The quality of the product that comes out of pretreatment depends on a number of factors, such as the physical and chemical conditions in the various pretreatment stages for example. The nature and implementation of the pretreatment process should be such that it allows continuous running for extended periods, so that the quality of the product that comes out of pretreatment is and can be constantly maintained within predetermined limits.

A prior art document EP 2 759 597 A1 discloses image analysis based process control of processes for production of sugar from lignocellulosic biomass, and a corresponding system. The method comprises steps like pretreating, saccharification, analyzing particles, and controlling process parameters on the basis of analysis data.

Another prior art document WO 2017/066042 A1 discloses NIR measurements in the production of a target chemical from cellulose. The method comprises steps like pretreating, analyzing with NIR spectroscopy, simultaneous saccharification and fermentation, analyzing anew with NIR spectroscopy, and controlling process parameters on the basis of the NIR analysis data.

SUMMARY

According to a first aspect there is provided a method for controlling values of process parameters of a pretreatment process of wood particles. The method comprises using a sampler to obtain a sample of a product flow of said pretreatment process after said wood particles have undergone steam explosion in a hemihydrolysis reactor, using a particle measurement device to measure one or more characteristics of particles in said sample and to produce one or more pieces of measurement information indicative of the measured characteristics, and using said one or more pieces of measurement information to select one or more values of one or more of said process parameters.

According to a second aspect there is provided a control system for controlling a pretreatment process of wood particles. The control system comprises one or more measurement information inputs for receiving measurement information indicative of measured characteristics of samples of a product flow in said pretreatment process. The control system comprises one or more control information outputs for set-ting values for one or more process parameters of said pretreatment process, and a processing engine coupled to said measurement information inputs and said control information outputs. The processing engine is programmed to execute a method of the kind described above.

BRIEF DESCRIPTION OF THE DRAWINGS

The accompanying drawings, which are included to provide a further understanding of the described embodiments and constitute a part of this specification, illustrate various advantageous features and examples of their combinations. In the drawings.

DETAILED DESCRIPTION

Numerical attributes such as first, second, third, and so on are used in this description and the appended claims for the purpose of giving unambiguous names to concepts. They do not refer to any particular order, unless otherwise explicitly stated.

In the context of this description the term wood particles refers to a material that consists mainly of pieces of wood formed by cutting or chipping larger pieces of wood such as trees, branches, logging residues, stumps, roots, and wood waste. The size of the wood particles may vary in a wide range from a few millimetres to a few centimetres, so the wood particles meant here are typically larger than those meant with the term sawdust. The wood used to make wood particles may be debarked or it main contain bark. For a wood-to-sugar process the preferred raw material is broadleaf wood due to its relatively high inherent sugar content, but the use of other kinds of wood is not excluded. The terms wood particles, wooden wood particles, or just wood particles can be used to mean the same thing as wood particles. The term wood particles is used in the appended drawing because it is short.

Figure 1:
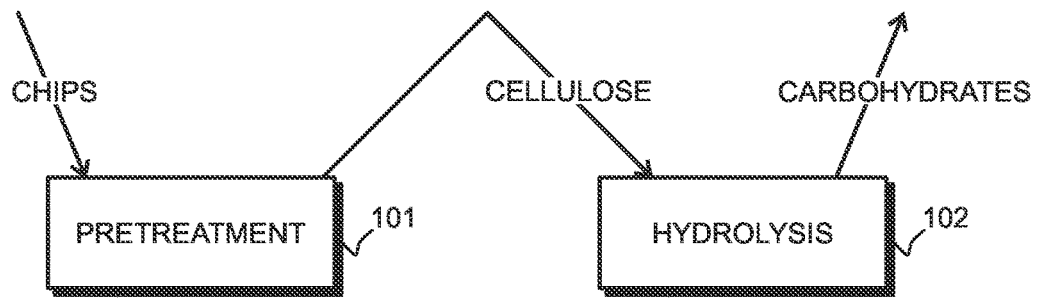
FIG. 1 illustrates a chemical refining process on a general level.

FIG. 1 illustrates schematically how in a method and arrangement for treating wood particles the wood particles may go to pretreatment, schematically illustrated as 101. The purpose of the pretreatment 101 is to prepare the incoming wood particles for efficient use in the process, by removing some unwanted impurities, by compensating for some of the natural fluctuations in the characteristics of the material, and by breaking down the natural structure of the wood material. Hemicellulose (C5 sugars) can be collected from the pretreatment 101, and cellulose (or lignocellulosic material) can be taken further to a hydrolysis 102 to produce carbohydrates of desired kind.

Figure 2:
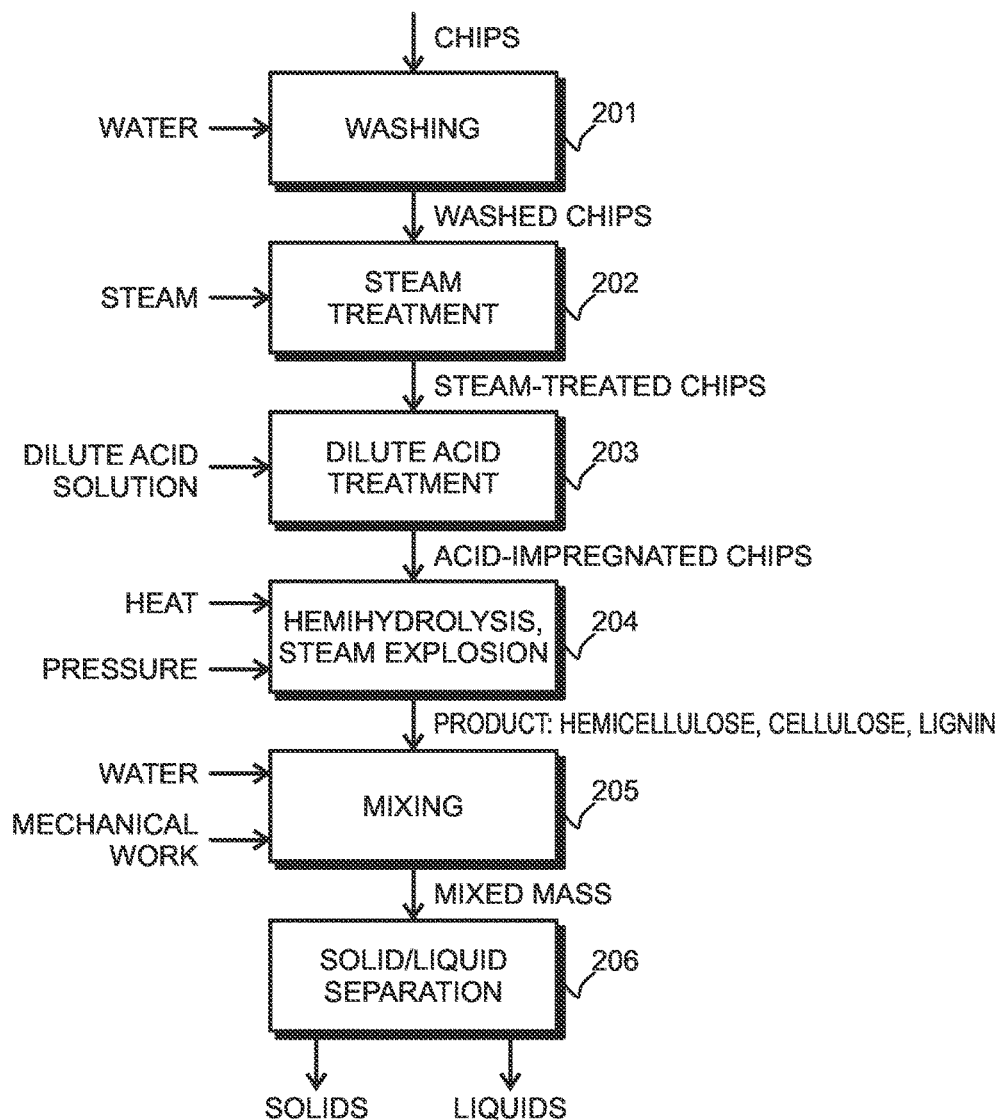
FIG. 2 illustrates an example of process stages in pretreatment.

FIG. 2 illustrates an example of a product flow through various stages that all belong to the pretreatment 101 of FIG. 1. Washing 201 is done with water, removing some mainly inorganic impurities such as sand. Washed wood particles are taken to steam treatment 202 for the purpose of removing air from inside the wood particles and to preheat them to an elevated temperature. Steam-treated wood particles are taken to dilute acid treatment 203 for impregnating them with a dilute acid solution. The aim of the dilute acid treatment 203 is to make the dilute acid solution penetrate into the wood particles as evenly as possible.

The acid-impregnated wood particles are taken to hemihydrolysis at 204 where they are under elevated pressure and temperature. At the output of the hemihydrolysis 204 the wood particles undergo a steam explosion that breaks their structure. The output stream from the hemihydrolysis and steam explosion 204 goes through steam separation (not separately shown) to mixing 205 where water is added and the resulting mass is homogenized mechanically to break up agglomerates. Solids and liquids may then be separated at 206 for feeding into later process stages.

When the effective operation of the pretreatment process is evaluated, there are a number of aspects that need to be considered. One of them is the severity of the reaction in the hemihydrolysis and steam explosion in the stage shown as 204 in FIG. 2. If the reaction is too severe, the product coming out of the reactor is too finely grained; in other words the particle size distribution of the product shows too large proportions in the smallest size bins, which makes the product more difficult to handle. Also, too severe a reaction at stage 204 may produce excessive amounts of unwanted chemical constituents like lactic acid and/or furfural, which have disadvantageous effects in the later stages of the process, while the yield of desired chemical constituents like C5 sugars becomes low. Towards the other extreme, if the reaction in the hemihydrolysis and steam explosion stage is too mild, i.e. not severe enough, the product coming out of the reactor is too coarsely grained for effective use in the later stages of the process, and the yield of desired chemical constituents like C5 sugars is again lower than would be possible.

Another aspect to be considered is the concentration and spatial distribution of acid in the wood particles when they enter the hemihydrolysis and steam explosion stage 204. If the dilute acid solution has not fully penetrated the wood particles, its catalyzing effect on the hemicellulose hydrolysis does not take full effect. The result of incomplete penetration of dilute acid solution to the largest wood particles can be seen as an increased skive content in the product that comes out of the reactor. On the other hand too much acid entering the reactor is not good either, because too high an acid concentration has a disadvantageous effect on the proceeding of the further, desired reactions in the process.

Another aspect to be considered consists of the homogeneity characteristics of the product after the mixing stage 205. The mixing stage could also be called dispersing, and the apparatus used may be called a mixer or a dispergator. If the mixing is not thorough enough there may occur an excessive amount of agglomerates in the mass. On the other hand, too vigorous mixing breaks the fine structure of the material grains that would be desirable, again making the particle size distribution skew too much towards the smallest size bins.

Figure 3:
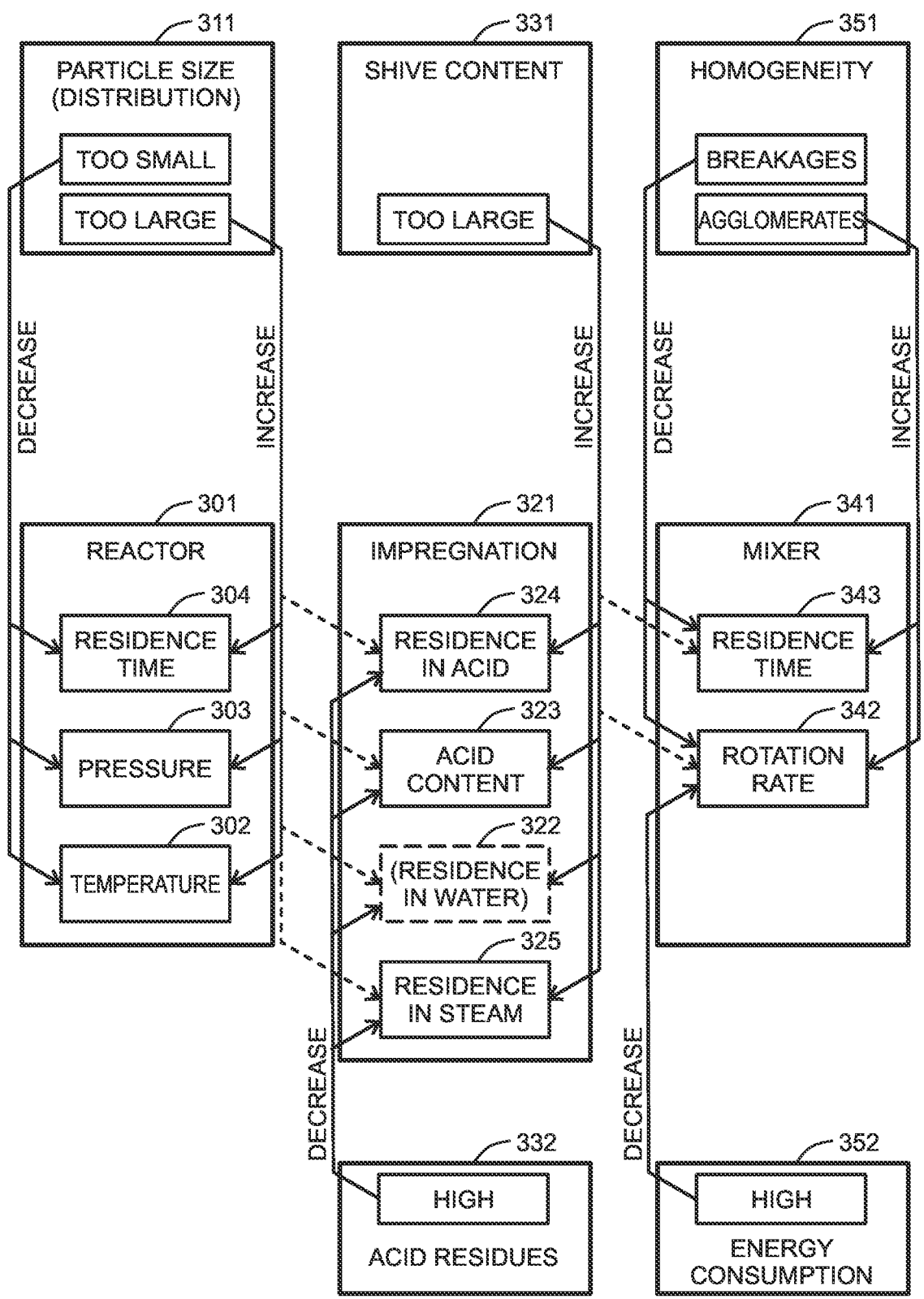
FIG. 3 illustrates an example of a method and an arrangement for feedback based control of process parameter values.

FIG. 3 illustrates principles of a method for controlling values of a number of process parameters. The method concerns in particular a pretreatment process of wood particles, when the pretreatment is used as a preparatory stage in a wood-to-sugar process. The process comprises the pretreatment described here, before hydrolysis of the fraction comprising cellulose to carbohydrates (including C6 sugars) and further a catalyctic conversion of the C6 sugars to glycols, meaning ethylene glycol and propylene glycol. A process parameter is a controllable quantity, like a pressure, a temperature, an acid concentration, a rotation rate, a residence time, a force, or the like. Controlling the value of such a process parameter may involve attempting to maintain the value at or close to a target value; or changing the value towards a new target value; or maintaining the value within a range of allowed values; or keeping the value out of a range of disallowed values; or making the value change continuously or periodically or repeatedly according to a control curve; or otherwise ensuring that the value is not arbitrary but a result of deliberate action.

The method comprises using a sampler to obtain a sample of a product flow of the pretreatment process after the wood particles have undergone steam explosion in a hemihydrolysis reactor. Strictly speaking it may be said that the steam explosion only takes place when the wood particles exit the hemihydrolysis reactor, but for the purposes of this text the output may be considered a part of the reactor. Comparing the schematic illustration in FIG. 2 the sample may be obtained between stages 204 and 205; or between stages 205 and 206; or after stage 206. The method comprises also using a particle measurement device to measure one or more characteristics of particles in the sample. The particle measurement device produces one or more pieces of measurement information indicative of the measured characteristics. The method comprises using said one or more pieces of measurement information to select one or more values of one or more of the process parameters, as will be explained in more detail later. Selecting a value for a process parameter may mean that a value is maintained as it is (i.e. deliberately selecting the current value also for future use) or selecting a new value, so that the value of the process parameter will be changed towards the new, selected value.

As shown on the left in FIG. 3, one process parameter for which a value can be selected is a temperature 302 in the hemihydrolysis reactor 301. Another process parameter for which a value can be selected is a pressure difference 303 between an input and an output of the hemihydrolysis reactor 301. Yet another process parameter for which a value can be selected is a residence time 304 of the product flow in the hemihydrolysis reactor 301. This residence time 304 is called here the first residence time to make a difference to other residence times that will be discussed later in this text.

The particle measurement device may be configured to measure particle size or particle size distribution 311 in the sample. Thus the particle size or particle size distribution—is an example of a characteristic of particles that can be measured. In a measurement of this kind measuring a particle size refers to producing a piece of measurement information that indicates a characteristic particle size, like a size or size range that—with appropriate weighting is a good general descriptor of a predominant particle size that has an important effect on how the mass behaves and how it can be handled. Correspondingly measuring a particle distribution refers to producing one or more pieces of measurement information that indicate two or more characteristic particle sizes and their relative proportions in the sample, so that the produced pieces of measurement information describe predominant particle size categories or particle size bins, occupants of which have an important effect on how the mass behaves and how it can be handled.

A particle measurement device that can be used to measure particle size and/or particle size distribution is preferably an automatic measurement device, or a device at least part of the operation of which can be automated. Optical methods are a preferable choice of measurement methods that can be automated and that produce information about particle size and/or particle size distribution. Optical measurement methods can be used to directly measure the amount and size of particles in a sample, where direct measurement means that the optical measurement device directly observes the particles in question, for example by diluting the sample into a slurry and obtaining a digital image of the sample, to be directed to programmable processing. Particle measurement devices that are known at the time of writing this description and that can be used this way include—but are not limited to—the Valmet FS5 fiber image analyzer and the Valmet MAP pulp analyzer.

The measured particle size or particle size distribution can be compared to a default size or a default size distribution respectively. The comparison may produce one of the pieces of measurement information referred to above. In particular, the comparison may indicate larger than default particles in the sample, or smaller than default particles in the sample.

If the measured particle size is too large, the reaction in the hemihydrolysis reactor 301 is probably not severe enough. Correspondingly the method may comprise increasing the value of the temperature 302, the pressure difference 303, and/or the first residence time 304 in the hemihydrolysis reactor 301 to increase reaction severity in response to the produced piece of measurement information indicating larger than default particles in the sample. If the measured particle size is too small, the reaction in the hemihydrolysis reactor 301 is probably too severe. Correspondingly the method may comprise decreasing the value of the temperature 302, the pressure difference 303, and/or the first residence time 304 in the hemihydrolysis reactor 301 to decrease reaction severity formation indicating smaller than default particles in the sample.

The temperature and pressure in the hemihydrolysis reactor 301 have a certain connection, because both are basically produced by feeding saturated (typically not superheated) steam into the reactor. Increasing pressure increases also temperature, and vice versa, unless superheated steam is used. A factor that affects solely the temperature difference between the input and output of the hemihydrolysis reactor is the pressure at which the product is allowed to discharge from the reactor.

The temperature 302 in the hemihydrolysis reactor 301 is typically between 160 and 220 degrees celcius, preferably between 185 and 205 degrees Celsius. The pressure in the hemihydrolysis reactor is typically between 5.5 and 22.4 bar-g, preferably between 10.5 and 16.5 bar-g. The discharging pressure at the output of the hemihydrolysis reactor may be as high as over 3 bar-g, or in the order of magnitude of 2 bar-g, or basically down to atmospheric pressure. Controlling the pressure difference 303 between the input and output of the hemihydrolysis reactor 301 is easiest to do by controlling the pressure inside the reactor, because changing the discharging pressure may require structural modifications. The first residence time 304 in the hemihydrolysis reactor 301 is typically between 2 and 20 minutes, preferably between 4 and 14 minutes.

As shown in the middle in FIG. 3, one process parameter for which a value can be selected is a second residence time 324 of said product flow in an impregnating vessel that precedes said hemihydrolysis reactor in said pretreatment. This residence time is the time for which the wood particles are immersed in the dilute acid solution. Another process parameter for which a value can be selected is the acid content 323 of an impregnating solution used to impregnate said product flow in said impregnating vessel. Another process parameter for which a value can be selected is the third residence time 322 of said product flow in a first soaking silo that may precede said impregnating vessel in said pretreatment, where the wood particles are immersed in water. Such a water-impregnating stage is optional in the pretreatment process. Yet another process parameter for which a value can be selected is the fourth residence time 325 of said product flow in a pre-steaming silo that may precede said impregnating vessel (and said first soaking silo, if one is used) in said pretreatment, where the wood particles are treated with steam. Yet another process parameter for which a value can be selected is the fifth residence time of said product flow in a second soaking silo that may be used between said impregnating vessel and said hemihydrolysis reactor in said pretreatment.

The five last-mentioned process parameters all have an effect on how much acid there is within the wood particle when it enters the hemihydrolysis reactor and how evenly that acid is distributed spatially within the wood particle. As a consequence there is certain deterministic dependency between the values of these process parameters and the shive content in the produce that comes out of the hemihydrolysis reactor.

The particle measurement device can be configured to measure shive content 331 in the sample as one of the characteristics of particles that were mentioned above. Same or similar particle measurement methods and devices can be used to measure shive content as those used to measure particle size. Shive content is typically expressed as a percentage that should be in the order of only few percent for the shive content to be acceptable. In principle the optimum would be no skives at all, but practice suggests that a zero shive content can only be achieved by making the reaction in the hemihydrolysis reactor so severe that the resulting products are not usable any more to any reasonable extent later in the process.

The measured shive content can be compared to a default shive content to produce one or more of the pieces of measurement information that were referred to above. A larger value for the second residence time 324 and/or a larger value for the acid content 323 may be selected to intensify the impregnation of wood particles the said impregnating vessel in response to said piece of measurement information indicating larger than default shive content. Additionally or alternatively, a larger value for the third residence time 322 or the fifth residence time mentioned above may be selected to intensify impregnation of wood particles in the first or second soaking silo respectively in response to said piece of measurement information indicating larger than default shive content.

As was pointed out, there are upper limits beyond which it is not feasible to prolong the second residence time 324 and/or the acid content 323 of the impregnating solution. One factor that sets upper limits may be the presence of acid residues 332 or other unwanted chemical constituents in the product that comes out of the hemihydrolysis reactor. The method may comprise using a measurement device to measure content of one or more chemical constituents in the product flow after the wood particles in the product flow have undergone steam explosion. The measurement device may produce one or more pieces of chemical constituent information indicative of the measured content. The method may comprise using said one or more pieces of chemical constituent information to select one or more values of said one or more process parameters. These chemical constituents may comprise for example furfural and/or lactic acid.

As shown on the right in FIG. 3, one process parameter for which a value can be selected is a rotation rate 342 of a mixer 341 that succeeds the hemihydrolysis reactor in the pretreatment process. Another process parameter for which a value can be selected is a sixth residence time 343 of said product flow in said mixer 341. As indicated above, the mixer 341 can also be called a dispergator.

These two last-mentioned process parameters have an effect on the measured homogeneity 351 of the product. The particle measurement device may be configured to measure homogeneity in the sample as one of the characteristics of particles. Although strictly speaking homogeneity is a property of the mass as a whole and not pertinent to any individual particle, it is nevertheless a manifestation of what kind of particles there are in the mass and how these particles have been treated in the preceding process stages. The measured homogeneity can be compared to a default homogeneity to produce one of the pieces of measurement information referred to above.

The value for the rotation rate 342 and/or the sixth residence time 343 may be increased to intensify homogenizing of said product flow in the mixer in response to the measurement information indicating lower than default homogeneity. Lower then default homogeneity may mean for example a larger than default occurrence of agglomerates, which can be detected with optical methods from the sample. Too intense homogenizing of the product flow may cause breakages in the delicate structure of the particles, which is then a possible triggering reason to decrease the rotation rate 342 and/or the sixth residence time 343. In this respect it should be noted that the particles of the product coming out of a hemihydrolysis reactor are considerably more fragile than those encountered in the production of pulp in papermaking, so that for example fiber fibrillation cannot be achieved.

Homogeneity in particular, but to some extent also other features that depend on characteristics of particles, can also be measured indirectly. Thus there may be one or more of the particle measurement devices mentioned above that are configured to measure one or more characteristics of particles in the sample through an indirect measurement method that does not measure directly the presence and size of particles in the sample. An example of such a device is a particle measurement device configured to measure drainability of the sample. Drainability can be expressed in terms of dewatering time, which can be measured for example by filtration, CSF, or SF, or with an automated system like the Valmet MAP. Slower filtration means finer particles.

There are also other factors that have an effect on how the values for the process parameters are selected. Energy consumption 352 should be minimized in all process stages. This is one reason, in addition to the desired avoiding of breakages in particle structure, to keep the rotation rate and residence time in the mixer 341 as low as possible, although simultaneously the homogeneity 351 must be prevented from deteriorating to unacceptable levels.

Measurements results on particle size (or particle size distribution) 311, skive content 331, and homogeneity 351 may have an effect on selecting the values of also other process parameters than those that were mentioned so far. As an example, a measurement that shows too large particle sizes may be a reason to increase the third, fourth, or fifth residence time, the acid content in impregnation 323, and/or the second residence time 324 in the dilute acid solution.

The schematic presentation in FIG. 3 can also be understood as a presentation of a control system for controlling a pretreatment process of wood particles. The control system comprises one or more measurement information inputs for receiving measurement information indicative of measured characteristics of samples of a product flow in said pretreatment process. In FIG. 3 these are represented by the occurrence of the various measureable features in blocks 311, 331, 332, 351, and 352. The control system comprises one or more control information outputs for setting values for one or more process parameters of said pretreatment process. In FIG. 3 these are represented by the arrows pointing to the process parameter blocks 302 to 304, 322 to 325, and 342 to 343. The control system comprises a processing engine coupled to said measurement information inputs and said control information outputs. As a processing engine a suitable industrial grade computer or arrangement of computers can be used. The processing engine is programmed to execute a method of the kind described in the foregoing.

It is obvious to a person skilled in the art that with the advancement of technology, the ideas explained above may be implemented in various ways. The claimed scope is thus not limited to the examples described above.

The invention claimed is:

1. A method for controlling values of process parameters of a pretreatment process of wood particles, the method comprising:
   sampling a product flow of said pretreatment process after said wood particles have undergone steam explosion in a hemihydrolysis reactor to obtain a sample;
   measuring one or more characteristics of particles in said sample to produce one or more pieces of measurement information indicative of the measured characteristics; and
   selecting, using said one or more pieces of measurement information, to select one or more values of one or more of said process parameters,
   wherein said measuring comprises using a particle measurement device to measure shive content in the sample, and
   wherein said selecting comprises selecting at least a value of a second residence time of said product flow in an impregnating vessel that precedes said hemihydrolysis reactor in said pretreatment and selecting at least one of the process parameters selected from:
   a third residence time of said product flow in a first soaking silo that precedes said impregnating vessel in said pretreatment,
   or
   a fifth residence time of said product flow in a second soaking silo that is between said impregnating vessel and said hemihydrolysis reactor in said pretreatment, and
   wherein said particle measurement device is configured to measure shive content in said sample as one of said one or more characteristics of particles, the measured shive content is compared to a default shive content to produce at least a second piece of said one or more pieces of measurement information, and value for at least one of said third residence time or said fifth residence time is selected to intensify impregnation of wood particles in said first or second soaking silo respectively in response to said second piece of measurement information indicating larger than default shive content.

2. A method according to claim 1, wherein said one or more of said process parameters comprise at least one of:
   a temperature in said hemihydrolysis reactor,
   a pressure difference between an input and output of said hemihydrolysis reactor, a first residence time of said product flow in said hemihydrolysis reactor.

3. A method according to claim 2, wherein:
said particle measurement device is configured to measure particle size or particle size distribution in said sample as one of said one or more characteristics of particles,
the measured particle size or particle size distribution is compared to a default size or a default size distribution respectively to produce at least a first piece of said one or more pieces of measurement information, and
value for at least one of said temperature, said pressure difference, or said first residence time is increased to increase reaction severity in said hemihydrolysis reactor in response to said first piece of measurement information indicating larger than default particles in said sample.

4. A method according to claim 2, wherein:
said particle measurement device is configured to measure particle size or particle size distribution in said sample as one of said one or more characteristics of particles,
the measured particle size or particle size distribution is compared to a default size or a default size distribution respectively to produce at least a first piece of said one or more pieces of measurement information, and
value for at least one of said temperature, said pressure difference, or said first residence time is decreased to decrease reaction severity in said hemihydrolysis reactor in response to said first piece of measurement information indicating smaller than default particles in said sample.

5. A method according to claim 1, wherein:
said particle measurement device is configured to measure shive content in said sample as one of said one or more characteristics of particles,
the measured shive content is compared to a default shive content to produce at least a second piece of said one or more pieces of measurement information, and
value for at least one of said second residence time or said acid content is selected to intensify impregnation of wood particles in said impregnating vessel in response to said second piece of measurement information indicating larger than default shive content.

6. A method according to claim 1, wherein said one or more of said process parameters comprise at least one of:
rotation rate of a mixer that succeeds said hemihydrolysis reactor in said pretreatment, or
a sixth residence time of said product flow in said mixer.

7. A method according to claim 6, wherein:
said particle measurement device is configured to measure homogeneity in said sample as one of said one or more characteristics of particles,
the measured homogeneity is compared to a default homogeneity to produce at least a third piece of said one or more pieces of measurement information, and
value for at least one of said rotation rate or said sixth residence time is increased to intensify homogenizing of said product flow in said mixer in response to said third piece of measurement information indicating lower than default homogeneity.

8. A method according to claim 1, wherein said particle measurement device is configured to directly measure presence and size of particles in said sample with an optical measurement method.

9. A method according to claim 1, wherein said particle measurement device is configured to measure one or more characteristics of particles in said sample through an indirect measurement method not measuring directly the presence and size of particles in the sample.

10. A method according to claim 9, wherein said particle measurement device is configured to measure drainability of said sample.

11. A method according to claim 1, comprising:
measuring content of one or more chemical constituents in said product flow after wood particles in said product flow have undergone said steam explosion, and to produce one or more pieces of chemical constituent information indicative of the measured content, and
selecting one or more values of said one or more process parameters using said one or more pieces of chemical constituent information.

12. A method according to claim 11, wherein said chemical constituents comprise at least one of: furfural, lactic acid.

13. A control system for controlling values of process parameters of a pretreatment process of wood particles, the control system comprising:
a sampler;
one or more measurement information inputs coupled to said sampler for receiving measurement information indicative of measured characteristics of samples taken by said sampler of a product flow in said pretreatment process;
one or more control information outputs for setting values for said one or more process parameters of said pretreatment process, and
a processing engine coupled to said measurement information inputs and said control information outputs;
wherein said processing engine is programmed to
obtain a sample of said product flow of said pretreatment process using said sampler after said wood particles have undergone steam explosion in a hemihydrolysis reactor,
measure one or more characteristics of particles in said sample using a particle measurement device, wherein said one or more characteristics of particles include at least shive content in the sample, and to produce one or more pieces of measurement information indicative of the measured characteristics; and
select one or more values of one or more of said process parameters using said one or more pieces of measurement information,
wherein said using of said one or more pieces of measurement information to select one or more values of said one or more of said process parameters comprises selecting at least a value of a second residence time of said product flow in an impregnating vessel that precedes said hemihydrolysis reactor in said pretreatment and selecting at least one of the process parameters selected from:
a third residence time of said product flow in a first soaking silo that precedes said impregnating vessel in said pretreatment, or
a fifth residence time of said product flow in a second soaking silo that is between said impregnating vessel and said hemihydrolysis reactor in said pretreatment, and
wherein said particle measurement device is configured to measure shive content in said sample as one of said one or more characteristics of particles, the measured shive content is compared to a default shive content to produce at least a second piece of said one or more pieces of measurement information, and value for at least one of said third residence time or said fifth residence time is selected to intensify impregnation of wood particles in said first or second soaking silo respectively in response to said second piece of measurement information indicating larger than default shive content.

* * * * *